April 5, 1932.  J. V. LILE  1,852,170
FILM SPLICER
Filed May 28, 1928  2 Sheets-Sheet 1
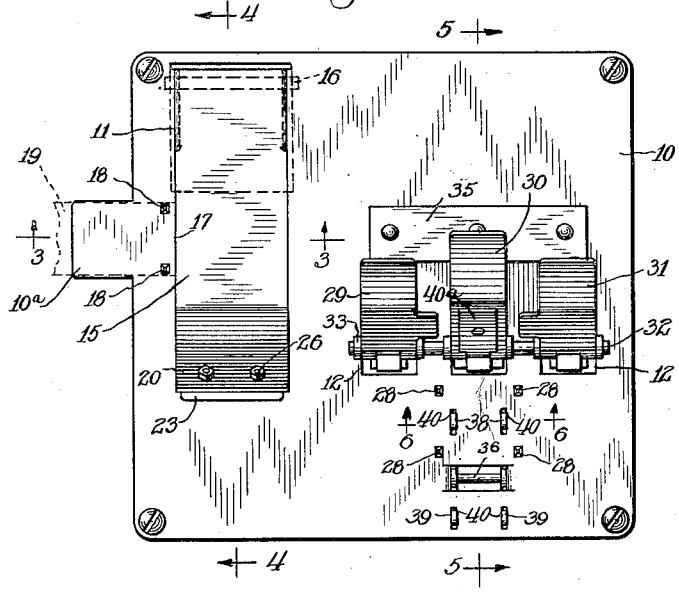
Inventor:
John V. Lile,
By Kent W. Worrell Atty

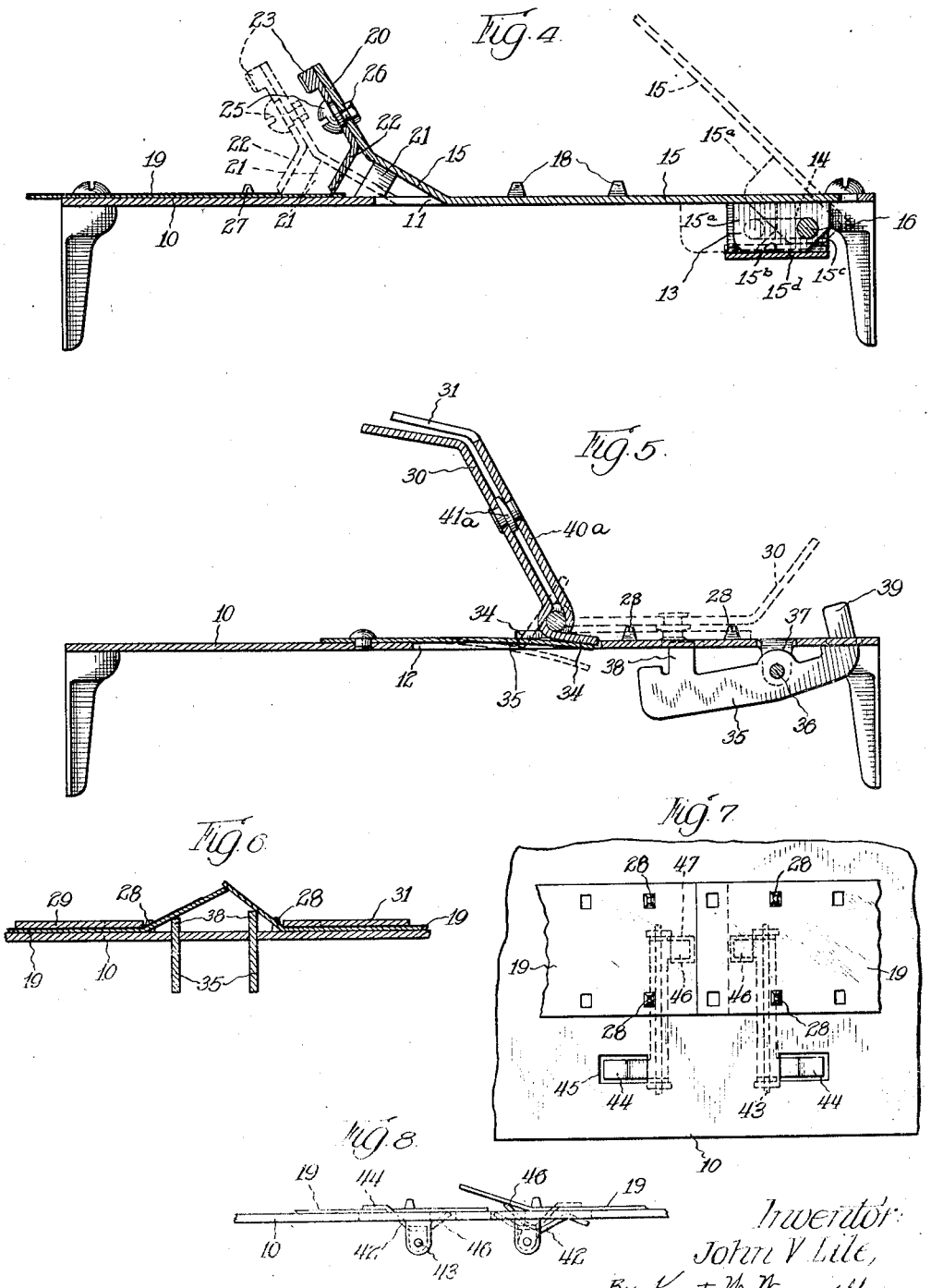

Patented Apr. 5, 1932

1,852,170

UNITED STATES PATENT OFFICE

JOHN V. LILE, OF CHICAGO, ILLINOIS; CHARLES LILE ADMINISTRATOR OF SAID JOHN V. LILE, DECEASED

FILM SPLICER

Application filed May 28, 1928. Serial No. 281,111.

This invention relates in general to a film splicing apparatus and has more particular reference to the accurate cutting and positioning of the film and the separation of the joined edges for applying the paste.

Among the principal objects of the invention are to provide a combined positioning scraper and cutter for cleaning the film and accurately trimming it, to position the film extremities to be joined and to hold them separately and jointly in place before and after the splice is made; to provide means for jointly and severally moving the film edges to be joined in applying the paste, and to prevent the joined film from adhering to the plate after the joint is made; and in general to produce the novel structure herein shown and described.

The accompanying drawings illustrate preferred embodiments of the invention.

In the drawings

Figure 1 is a plan view of film splicing mechanism constructed in accordance with this invention and mounted upon a suitable supporting plate;

Figure 2 is a front elevation of mechanism shown in Figure 1;

Figure 3 is a section taken on the line 3—3 of Figure 1;

Figure 4 is a section taken on the line 4—4 of Figure 1;

Figure 5 is a section taken on the line 5—5 of Figure 1;

Figure 6 illustrates the application of film sections to be joined as taken on the line 6—6 of Figure 1; and Figures 7 and 8 are plan and end views respectively of a modified form of film raising mechanism.

In splicing a film, one of the first requisites is that the film sections be accurately joined; the sensitized material must be cleaned from one side of one of the sections; both sections must be trimmed accurately so that there will not be too much or too little overlapping of the sections; and in uniting the sections by pasting them together it is very desirable that one or both of the ends be raised for applying adhesive thereto. After the adhesive is applied it is desirable to apply pressure to the joined edges which causes the excess adhesive to exude from the sides, tending to make the joined film stick to the plate upon which it is supported; the present invention provides means for pressing the joined film upwardly at the juncture, thereby preventing its adherence to the plate and easily separating it therefrom.

Referring more particularly to the drawings, the various parts are conveniently mounted upon a plate 10 which is supported in any suitable manner, the plate being formed with apertures 11 and 12 in which the operating blades are mounted. Turned downwardly in the opening 11 are lugs 13 each having a slot 14 in which a blade 15 is mounted on shaft 16 which projects through pivoting lugs 15$^a$ so that the blade may be rotated and moved longitudinally in the slots 14. To hold the blade 15 resiliently in raised position, as indicated by the broken outline in Figure 4, and in its lowered position, its pivoting lugs 15$^a$ are formed with contact surfaces 15$^b$ and 15$^c$ adapted to be engaged by a flat spring 15$^d$ attached to the under side of the plate 10 and of sufficient width to permit reciprocation of the blade in the slots 14. At the side of the blade 15 is a cutting edge 17 for engaging the extremity of a film placed upon the plate and held in proper spaced relation thereon by projections 18 so that the downward movement of the plate 17 will trim off the end of a film 19, as clearly indicated in Figure 3.

At the extremity of the blade 15 is a turned-up end 20 with oppositely turned feet 21 to engage the plate (see Figure 4) and limit the downward movement of the blade.

Attached to the turned-up extremity 20 is a scraper 22 having a knurled upper edge 23 for engagement by the thumb or fore fingers while the blade 15 is being operated to move the scraper transversely of the blade by means of the slots 24 therein through which the eccentric adjusting screws 25 extend, the latter being supported by and adjustably secured to the up-turned extremities 20 of the blade 15 by nuts 26. This scraper 22 is mounted at such a height that it will engage and remove the sensitized coating from the film when the blade is pressed downwardly against it, as shown in Figure 4, and by reciprocating the cutting edge 17 and blade 15 back and forth on its mounting slots 14 the sensitized matter is removed from the film a distance engaged by the scraping edge.

In order to hold the film properly in place for this scraping movement, a pair of projections 27 are positioned in the plate 10 in front of the blade 15 for engaging the opposite perforations of the film. In removing the sensitized material from a film, the end of the film or sensitized material thereon is slightly moistened so that it is easily disengaged by the scraper 22. The lateral movement of the scraper is provided for the purpose of eliminating any scratch marks on the film by presenting different surfaces of the scraper edge for the reciprocating movement thereof.

The feet 21 are intended to prevent contact of the cutting edge of the scraper 22 with the plate 10 and the eccentric adjustment of the screws 25 is provided for setting the scraper properly to engage the film.

After the sensitized material is scraped from the film, the scraped end of the film is placed in engagement with the projections 18 at the side of the blade 15, and the downward movement of the blade trims the film at the proper distance. In order to assist in positioning the film at this trimming point, the plate 10 is provided with a lateral extension 10$^a$ substantially the same width as the film to be trimmed and located opposite the projections 18 so that the film is engaged thereby.

Sensitized material is applied to one side only of the film so that in making a splice the sensitized material is removed from one end only, and after the other end to which it is joined is similarly trimmed by the blade 15, the two ends are placed in overlapping relation where they are held in proper spaced position by projections 28, as indicated in Figure 6. Three levers 29, 30 and 31 are mounted upon a common shaft 32 in bearing lugs 33 struck up from the plate 10 from the material of the openings 12. Each of the three levers has oppositely extending tails 34 engaged by a spring tongue 35 extending in its opening 12 and operating to hold the lever yieldingly in raised position or pressed lightly against the plate. The two outside levers 29 and 31 are formed with inward projections 29$^a$ and and 31$^a$ for engaging and holding the film pieces against the plate 10 and in contact with the spaced projections 28.

To obviate the necessity of using a pointed instrument in raising one or both of the film ends and to apply paste smoothly and evenly to the overlapping ends of the film, one or both of the overlapping edges is raised, as indicated in Figures 6 and 8. To accomplish this result a pair of levers 35 are mounted upon a shaft 36 in downwardly turned lugs 37 of the plate 10 and each lever has tongues 38 and 39 adapted to extend through openings 40 and 41 of the plate. The openings 40 are directly at the side of the splice which is being made in the film, and these levers are so disposed that the tongues 38 are normally below the upper surface of the plate 10 while the tongues 39 are lifted by the weight of the opposite end of the levers through the openings 41 where they may be engaged by the fingers of an operator for pressing either one or both of the film pieces upwardly, both levers being operated simultaneously after the splice is made for disengaging the film from the projections 28 and from preventing it from adhering to the plate 10.

In order to hold the film tightly together while the splice is being made, the central lever 30 is provided with a plate 40$^a$ having a central fastening means 41$^a$ for securing it loosely to the lever 30 so that when the latter is pressed downwardly against the film the plate 40$^a$ will bear evenly against the splice. By pressing this lever 30 firmly against the splice for a short time, the excess adhesive is pressed from the joint and the splice is securely fastened. The film may then be removed by the levers 35 as explained.

Instead of the levers 35, a different form of lever 42 (Figures 7 and 8) may be mounted on a shaft 43 at the under side of plate 10 having a finger engaging portion 44 at one end projecting through an opening 45 in plate 10 and having a projection 46 at the other end extending through an opening 47. This form has the advantage that extremities 44 and 46 can be made of considerable width so that they will have more bearing surface for engagement of the fingers of an operator and also more bearing surface for the under side of the film. With this construction the film is held accurately in place for each and all of the operations, and the projections position the film so that the operations will be performed in the proper places.

In scraping the sensitized material from the film, it is located by projections 27 so that the scraper blade will remove only a predetermined amount of the material therefrom; the location of the projections 18 determines the amount of film cut off by the operation of the blade 15; the location of the projections 28 causes proper overlapping of the film for the pasting operation; holding the film ends tightly upon the projections 28 causes them to overlap in the proper position for securing them together under the pressure of the lever 30, and the disengagement of the spliced film prevents mutilation of the feeding perforations when the film is disengaged from the projections 28.

It is obvious that various changes of construction may be made without departing from the spirit and scope of this invention.

I claim:

1. In a film splicer, the combination with pivoted and sliding means for engaging and removing the sensitized material from one side of a film, of a trimmer for the end of a film thus scraped, means for holding the ends of film to be joined in spaced overlapping position, and means for engaging the ends of film to be joined, both separately and in unison for spacing the ends apart before they are joined.

2. In a film splicer, a plate having film holding projections and adjacent perforations, means mounted in the perforations for engaging and holding film ends in overlapping relation on said projections, one of said means also having a loosely mounted plate for engaging directly over the film splicing joint, means for disengaging a spliced film from the projections, and a blade having spring tongues extending into the openings for holding said means yieldingly in raised and lowered positions.

3. In a film splicer, a plate having film holding projections thereon, spring pressed means mounted in the plate for yieldingly engaging film ends adjacent the projections, means mounted to extend through the plate between the projections for separately engaging film ends to be spliced and for raising a spliced film from engagement with said projections, and a spring pressed member having a loosely mounted self-positioning plate for bearing upon film at the overlapping joint thereof when it is being spliced, the plate conforming to the joint of the film.

4. In a film splicer, a plate having film holding projections and means for holding film ends in overlapping position between said projections, a surface conforming pressure plate to engage film ends between said projections, and weighted levers mounted on the under side of the plate having projections at the ends, the plate having perforations to receive the projections, the weighted ends of the levers being disposed below and between the said projections to separately engage the under side of film ends, and the other ends of said levers extending through openings in the plate and being manually depressible to raise the weighted ends for separately and jointly engaging the adjacent film ends.

5. A film splicer comprising means for holding a film, and a pivoted and sliding member having a scraping edge movable longitudinally of a film for engaging and removing the sensitized material from one side of a film.

6. A film splicer comprising means for holding one end of a film, and a pivoted and sliding member operatively movable lengthwise of a film and having a transverse scraping surface at one end for engaging and removing the sensitized material from a film and having a cutting edge at one side for trimming the end of a film thus scraped.

7. In a film splicer comprising a pivoted member and means forming a slidable connection at the pivot, an adjustable scraper blade mounted at the end of the member for engaging the film, and supporting feet for the end of the member to extend below the level of the blade.

8. In a film splicer, a scraper blade and mounting means therefor having a pivotal and sliding movement, said mounting means including a pin and slot connection for the blade to permit a lateral sliding movement thereof.

9. In a film splicer, a pivoted member having a longitudinal sliding movement, a scraper blade, means for adjustably mounting the blade at one end of the member, said means including transverse slots in the blade, and adjustable eccentric screws extending through the slots for controlling the contact of the ends of the blade with a film and for varying the transverse scraping surface of the scraping edge.

10. In a film splicer, a spring pressed member having a pivotal and sliding mounting, a scraper blade for the free end thereof, means for mounting the blade on the member for a transverse sliding movement, and an end of the engaging surface at the top of the blade for manually varying the transverse position of the blade with respect to the member.

11. In a film splicer, a pivoted and sliding side cutter blade having an upturned end, a scraper blade, means for adjustably mounting the scraper blade at the end of the side cutter blade, and means for holding a film in position to be engaged by the scraper blade and at the side of the other blade for trimming the end thereof.

12. In a film splicer, an apertured plate having a lateral projection approximately the width of a film, a pair of film engaging projections at the end of the aperture and at the side thereof opposite the plate extension, a blade mounted in the plate for pivotal and sliding movement at one end having a lateral cutting edge opposite the plate extension, and a scraper blade adjustably mounted at the end of the other blade and laterally movable for engaging and removing the sensitized material from the face of a film held by the projections at the end of the aperture.

13. In a film splicer, a plate having a plurality of openings and a member pivotally mounted in each opening, means projecting upwardly from the plate for variously positioning film thereon by engaging the perforations thereof, means mounted in one of the openings having a scraper blade at one end and a side cutting edge for scraping the end of a film and cutting off the scraped edge.

others of said members adapted to engage adjacent the ends of film pieces to be spliced and hold them in proper overlapping relation, and means mounted in the plate for raising the ends of the film pieces separately and in conjunction before they are united.

JOHN V. LILE.